United States Patent Office 3,578,614
Patented May 11, 1971

3,578,614
ALPHA-HYDROXY-CARBOXYLIC ACIDS AS CURING RATE ACCELERATORS FOR CURABLE POLYMER SYSTEMS
Walter R. Wszolek, Sykesville, Md., assignor to W. R. Grace & Co., New York, N.Y.
No Drawing. Filed Oct. 21, 1968, Ser. No. 778,368
Int. Cl. C08d 9/02; C08f 27/06; C08g 22/00
U.S. Cl. 260—13                                     21 Claims

ABSTRACT OF THE DISCLOSURE

This invention relates to accelerated curing of a liquid composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four, in the presence of a novel class of curing rate accelerators from the group consisting of oxalic acid and an α-hydroxy carboxylic acid of the formula

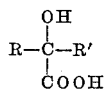

wherein R and R' are independently selected from the group consisting of —CH₂COOH, —CHOHCOOH, hydrogen, aryl, alkyl containing 1–18 carbon atoms.

---

In the adhesive field today, especially when adhering metals, the main adhesive employed is the epoxy class of adhesives. However, the epoxy type adhesives have several drawbacks. One of the main drawbacks is that the curing rate even at elevated temperatures in excess of 250° F. are not rapid enough to make the system commercially feasible. That is, curing times of 1 hour or more at 250° F. are necessary to obtain a hardened fully cured adhesive.

Recently, we have discovered that polyenes containing at least two unsaturated carbon to carbon bonds per molecule in combination with a polythiol and a photosensitizer can be cured by exposure to actinic radiation. These combinations make admirable adhesives but, of necessity for U.V. curing, the material to be bonded must be U.V. transparent. Further work with these compositions has shown them to be curable adhesives when heat is applied for extended periods, e.g. 250° F. for 1 day. Such a curing rate is however commercially unacceptable.

One object of the instant invention is to provide a liquid curable composition which can be cured rapidly within time periods of less than ½ hour. Another object of the instant invention is to provide liquid curable compositions which can be cured at ambient temperatures below 250° F. These and other objects will become apparent from a reading hereinafter.

Summarily, the above and other objects are obtained by forming a liquid curable composition comprising a polyene containing at least two reactive unsaturated carbon to carbon bonds per molecule, the total combined functionality of (a) the unsaturated carbon to carbon bonds per molecule in the polyene and (b) the thiol groups per molecule in the polythiol being greater than four and a curing rate accelerator from the group consisting of oxalic acid and an α-hydroxycarboxylic acid of the formula

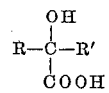

wherein R and R' are each independently selected from the group consisting of —CH₂COOH, —CHOHCOOH, hydrogen, aryl, alkyl containing 1–18 carbon atoms.

For the purpose of brevity the group members of operable curing rate accelerators will hereinafter be referred to as α-hydroxycarboxylic acids.

The amount of curing rate accelerator in the adhesive composition is in the range 0.01–10.0 percent by weight based on the composition, preferably 0.1–5.0 percent by weight.

Examples of α-hydroxycarboxylic acids which are operable in the instant invention include, but are not limited to, citric, malic, tartaric, oxalic, lactic, atrolactic, mandelic, benzilic acid and the like.

The polythiols and one group of operable polyenes which can be cured rapidly are set out in a copending application assigned to the same assignee having Ser. No. 617,801 filed Feb. 23, 1967, and are incorporated herein by reference. That is, one group of polyenes operable in the instant invention are those having a molecular weight in the range 300 to 20,000, a viscosity ranging from 0 to 20 million centipoises at 70° C. of the general formula: [A]—(X)ₘ wherein X is a member of the group consisting of

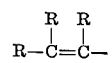

and —C≡C—; m is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of said operable polyenes include, but are not limited to (1) Crotyl-terminated polyurethanes which contain two "reactive" double bonds per average molecule in a near terminal position of the average general formula:

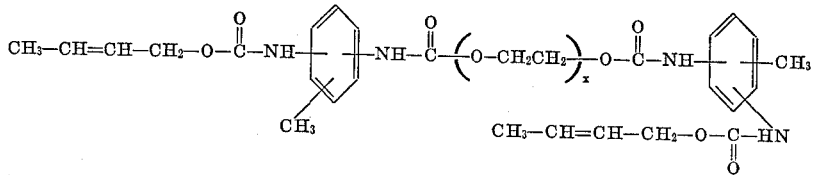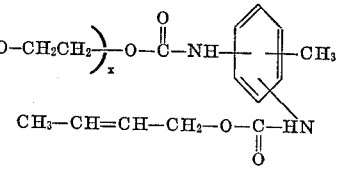

wherein $x$ is at least 1, (2) Ethylene/propylene/non-conjugated diene terpolymers, such as "Nordel 1040" manufactured by du Pont which contains pendant "reactive" double bonds of the formula: —$CH_2$—CH=CH—$CH_3$, (3) The following structure which contains terminal "reactive" double bonds:

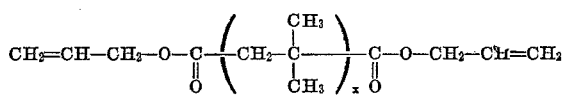

where $x$ is at least 1, (4) The following structure which contains near terminal "reactive" double bonds:

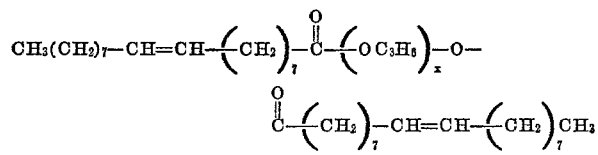

where $x$ is at least 1.

As used herein polyenes and polyynes refer to simple or complex species of alkenes or alkynes having a multiplicity of pendant, terminally or near terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this monovinylacetylene, which is a polyene under our definition. For purposes of brevity all these classes of compounds will be referred to hereafter as polyenes.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrenebutadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g. adipic acid-butenediol, 1,6-hexanediamine-fumaric acid and 2,4-tolylene diisocyanate-butenediol condensation polymers and the like.

A third group of polyenes operable in this invention includes those polyenes in which the reactive unsaturated carbon to carbon bonds are conjugated with adjacent unsaturated groupings. Examples of operable reactive conjugated ene systems include, but are not limited to, the following:

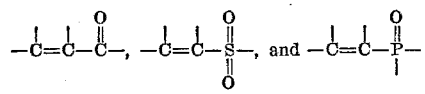

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1175, the triacrylate of the reaction product of trimethylolpropane with 20 moles of ethylene oxide, and the like.

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity all of these positions will be referred to generally as "terminal" unsaturation.

The liquid polyenes operable in the instant invention contain one or more of the following types of non-aromatic and non-conjugated "reactive" carbon to carbon unsaturation:

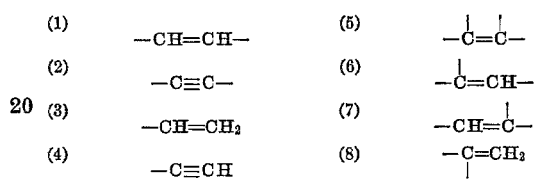

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as

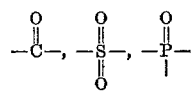

and the like so as to form a conjugated system of unsaturated bonds exemplified by the following structure:

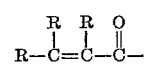

etc. On the average the polyenes must contain 2 or more "reactive" unsaturated carbon to carbon bonds/molecule and have a viscosity in the range from 0 to 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range 50–20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage

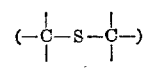

as contrasted to the term "unreactive" carbon to carbon unsaturation which means

groups when found in aromatic nuclei (cyclic structures exemplified by benzene, pyridine, anthracene, tropolone and the like) which do not under the same conditions react with thiols to give thioether linkages. In the instant invention products from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned —SH functional groups per average molecule.

On the average the polythiols must contain 2 or more —SH groups/molecule. They usually have a viscosity range of 0 to 20 million centipoises (cps.) at 70° C. as measured by a Brookfield viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The polythiols operable in the instant invention can be exemplified by the general formula: $R_8(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, S, P or O but primarily contains carbon-hydrogen, carbon-oxygen, or silicon-oxygen containing chain linkages free of any reactive carbon to carbon unsaturation.

One class of polythiols operable with polyenes in the instant invention to obtain essentially odorless polythioether products are esters of thiol-containing acids of the general formula: $HS—R_9—COOH$ where $R_9$ is an organic moiety containing no "reactive" carbon to carbon unsaturation with polyhydroxy compounds of the general structure: $R_{10}(OH)_n$ where $R_{10}$ is an organic moiety containing no "reactive" carbon to carbon unsaturation and $n$ is 2 or greater. These components will react under suitable conditions to give a polythiol having the general structure:

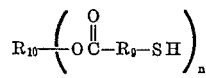

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include but are not limited to esters of thioglycolic acid ($HS—CH_2COOH$), α-mercaptopropionic acid ($HS—CH(CH_3)—COOH$) and β-mercaptopropionic acid ($HS—CH_2CH_2COOH$) with polyhydroxy compounds such as glycols, triols, tetraols, pentaols, hexaols, etc. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrkis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

As used herein the term "liquid curable composition" means a liquid composition having a viscosity in the range 0 to 20 million centipoises at 70° C. which is solidified by curing on addition of the curing rate accelerator disclosed herein under ambient conditions.

As used herein the term "non-yellowing" means the substantial resistance during prolonged exposure to actinic radiation (such as exposure outdoors in sunlight, etc.), to unsightly or uncontrollable discoloration. Polyurethanes derived from aromatic diisocyanates or polyisocyanates are not resistant to discoloration and, depending on the extent of the exposure to actinic light, will turn yellow, amber, orange or brown. Such uncontrolled discoloration completely rules out the use of "unfilled" products. Even the use of pigments or fillers fails to overcome unsightly color changes over extended periods of time.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality (f) of three. A polymeric dithiol is a polythiol with an average of two thiol groups per molecule and thus has a functionality (f) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however, the reaction were carried to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

The aforesaid polyenes and polythiols can, if desired, be formed or generated in situ and still be rapidly cured by the process of the instant invention.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The compositions to be cured, i.e., (converted to solid resins or elastomers) in accord with the present invention may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably 0.005–300 parts on the same basis.

In all the curable liquid systems herein the compositions consists of 2 to 98 parts by weight of a polyene containing at least 2 reactive unsaturated carbon to carbon bonds per molecule, 98 to 2 parts by weight of a polythiol containing at least 2 thiol groups per molecule and 0.01 to 10.0 parts by weight of a curing rate accelerator.

The compounding of the components prior to curing can be carried out in several ways. For example, the curing rate accelerator can be dissolved in the polyene at ambient temperature or at elevated temperatures up to about 110° C. then cooled to room temperature whereat the polythiol can be added to the system. Another method of compounding is to dissolve the curing rate accelerator in an inert solvent, e.g. ethyl alcohol, admix the solution in the polyene, pull off the solvent under vacuum and then add the polythiol. Still another method is to dissolve the curing rate accelerator in a plasticizer, e.g. "Benzoflex 9–88" commercially available from Carlisle Chemical Corp. which is thereafter admixed in the polyene followed by admixing the polythiol into the system. In all cases for the best results it is preferred to avoid extended periods at elevated temperatures while compounding. Additionally, to insure that precuring does not occur, the polythiol is generally the final component compounded into the curing system.

The following examples will aid in explaining, but should not be deemed as limiting, the instant invention. In all cases, unless otherwise noted, all parts and percentages are by weight.

PREPARATION OF POLYENE

Example 1

1 mole of a commercially available polyoxypropylene glycol commercially available from Union Carbide Co. under the tradename "PPG 2025" was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4-diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2=CH-$ terminated liquid prepolymer had a molecular weight of approximately 2400 and will hereinafter be referred to as Prepolymer A.

Example 2

0.25 g. of benzilic acid was admixed with 10 g. of Prepolymer A from Example 1 in an aluminum dish for 5 minutes at 110° C. to dissolve the acid in the polyene. The polyene was then cooled to room temperature. 1 g. of pentaerythritol tetrakis ($\beta$-mercaptopropionate) commercially available from Carlisle Chemical Co. under the tradename "Q43" was added to the liquid polyene and the thus formed composition was placed in an oven at 100° C. After 5 minutes the composition was removed from the oven as a solid cured mass. A control run using the same reactants and procedure as set out herein except that the 0.25 g. of benzilic acid was omitted from the adhesive composition failed to cure at 250° F. within 24 hours.

To show that it is not necessary to heat the composition of the instant invention and still obtain fast curing in a relatively short period the following example was performed.

Example 3

0.25 g. of benzilic acid was dissolved in 3.25 g. of a plasticizer commercially available from Velsicol Chemical Corp. under the tradename "Benzoflex" 988. The plasticizer contained the benzilic acid was then admixed with 10 g. of Prepolymer A from Example 1 and thereafter 1 g. of pentaerythritol tetrakis ($\beta$-mercaptopropionate) commercially available from Carlisle Chemical Corp. under the tradename "Q43" was added to the system. The thus admixed composition in an aluminum dish was maintained under atmospheric conditions at room temperature. Within 15 minutes the composition cured to a hard solid mass.

Example 4

The previous Example 3 was repeated except that the admixed composition was maintained at a temperature of 0° C. in an ice bath. After 100 minutes, the composition cured to a hardened solid mass.

The following examples show that the curing rate accelerator can also be activated by U.V. radiation.

Example 5

0.25 g. of benzilic acid were added to Prepolymer A from Example 1 and admixed therewith for 5 minutes at 110° C. to dissolve the acid. The admixture was then cooled to room temperature and 1.0 g. of pentaerythritol tetrakis ($\beta$-mercaptopropionate) was admixed into the system. The admixed composition was poured into an aluminum dish and exposed to U.V. radiation from a 275 watt Sylvania sun lamp. After 2 minutes, a hard solidified cured mass resulted.

In a control run using the reactants and procedure herein except that the 0.25 g. of benzilic acid was omitted, required over 2 hours of U.V. radiation to obtain a hard solidified cured mass.

Example 6

Example 5 was repeated except that 0.005 g. of benzilic acid was substituted for the 0.25 g. of benzilic acid. After 4 minutes a hard solidified mass resulted.

Example 7

The reactants and procedure of Example 2 were repeated except that curing of the composition was performed under an infrared lamp which heated the composition to 100° C. After 5 minutes a cured, solid mass resulted.

The solid cured polythiol ether polymer products resulting from the instant invention have many and varied uses. Examples of some uses include, but are not limited to, adhesives; caulks, elastomeric sealants; liquid castable elastomers; thermoset resins; laminating adhesives, and coatings; mastics; and the like.

The curable liquid polymer compositions containing the curing rate accelerator of the instant invention prior to curing can be pumped, poured, brushed, sprayed, doctored, rolled, trowelled, dipped-coated, extruded or gunned into place, into cavities, into molds, or onto vertical or horizontal flat surfaces in a uniform fashion. Following such application curing in place to a solid resin or an elastomer can be made to occur very rapidly. The compositions can be applied to various substrates and adhere well to glass, wood, metals, concrete, certain plastics, paints, enamels, fabrics, paper, paper board, porcelain, ceramics, brick, cinder block and plaster.

The liquid polythiolether-forming components and compositions of the instant invention can, prior to curing, be admixed with or blended with other monomeric and polymeric materials such as thermoplastic resins, elastomers or thermosetting resin monomeric or polymeric compositions. The resulting blend can be subjected to conditions for curing or co-curing of the various components of the blend to give cured products having unusual physical properties. Examples of the classes of the materials which can be admixed, blended or co-cured with the polythiolether-forming compositions of the instant invention are illustrated by, but not limited to, the following: epoxy resins, phenolic resins, polysulfide resins, and elastomers, polyurethane resins and elastomers, polyamide resins, polyvinyl chloride resins, amphorous or crystalline polyolefins, polyacrylonitrile polymers, silicone polymers, urea-formaldehyde resins, polyether resins and elastomers and the like.

What is claimed is:

1. A curable composition consisting essentially of (1) a polyene containing at least two reactive unsaturated carbon to carbon bonds permolecule, (2) a polythiol containing at least two thiol groups per molecule, the total combined functionality of (a) the reactive unsaturated carbon to carbon bonds per molecule in the polyene and (b) the thiol groups per molecule in the polythiol being greater than four, and (3) a curing rate accelerator from the group consisting of oxalic acid and an α-hydroxyl carboxylic acid of the formula

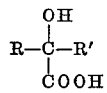

wherein R and R' are independently selected from the group consisting of —CH₂COOH, —CHOHCOOH, hydrogen, aryl, alkyl containing 1–18 carbon atoms.

2. The curable composition according to claim 1 where the polyene is the reaction product of polytetramethylene ether glycol having a molecular weight of about 1,000, polytetramethylene ether glycol having a molecular weight of about 2,000, tolylene diisocyanate and allyl isocyanate in a mole ratio of 1:1:1:2 respectively.

3. The curable composition according to claim 1 wherein the polyene is a styrene/butadiene rubber.

4. The curable composition according to claim 1 wherein the polyene is the reaction product of polytetramethylene ether glycol having a molecular weight of about 2,000 and allyl isocyanate in a mole ratio of 1:2 respectively.

5. The curable composition according to claim 1 wherein the polyene is the reaction product of a solid polyester diol and allyl isocyanate in a mole ratio of 1:2 respectively.

6. The curable composition according to claim 1 wherein the polyene is the reaction product of polyoxypropylene diol having a molecular weight of about 2,000, tolylene 2,4-diisocyanate and allyl alcohol in a mole ratio of 1:2:2 respectively.

7. The curable composition according to claim 1 wherein the polyene is the reaction product of a phthalate or succinate esterol derived from polytetramethylene ether glycol and allyl isocyanate having a molecular weight of about 4,000.

8. The curable composition according to claim 1 wherein the polyene is the reaction product of polytetramethylene ether glycol having a molecular weight of about 3,000 and allyl isocyanate in a mole ratio of 1:2 respectively.

9. The curable composition according to claim 1 wherein the polyene is the reaction product of polyoxypropylene triol having a mole ratio of 1:3 respectively.

10. The curable composition according to claim 1 wherein the polyene is poly-1,3-butadiene.

11. The curable composition according to claim 1 wherein the polyene is the reaction product of trimethylol propane and ethylene oxide.

12. The curable composition according to claim 1 wherein the polyene is triallyl urea.

13. The curable composition according to claim 1 wherein the polyene is cellulose acetate methacrylate.

14. The curable composition according to claim 1 wherein the polyene is the reaction product of 1,4-butadienediol and allyl isocyanate in a mole ratio of 1:2 respectively.

15. The composition according to claim 1 wherein the curing rate accelerator is a member of the acid group consisting of citric, malic, tartaric, oxalic, lactic, atrolactic, mandelic and benzilic acid.

16. In the process of curing the composition consisting essentially of (1) a polyene containing at least two unsaturated carbon to carbon bonds per molecule reactive with polythiols, and (2) a polythiol containing at least two thiol groups per molecule, the total combined functionality of (a) the reactive unsaturated carbon to carbon bonds per molecule in the polyene and (b) the thiol groups per molecule in the polythiol being greater than four and the weight ratio of the polyene to the polythiol being 2 to 98: 98 to 2, the improvement whereby the curing is accelerated which comprises adding to the composition 0.01 to 10.0 percent by weight of a curing rate accelerator from the group consisting of oxalic acid and α-hydroxy carboxylic acid of the formula

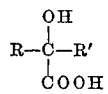

wherein R and R' are independently selected from the group consisting of —CH₂COOH, —CHOHCOOH, hydrogen, aryl, alkyl containing 1 to 18 carbon atoms.

17. The process according to claim 16 wherein the curing rate accelerator is a member of the acid group consisting of citric, malic, tartaric, oxalic, lactic, atrolactic, mandelic and benzilic acid.

18. The process of curing to a hardened mass a liquid curable composition consisting essentially of (1) a polyene containing at least two unsaturated carbon to carbon bonds per molecule reactive with polythiols, (2) a polythiol containing at least two thiol groups per molecule, the total combined functionality of (a) the reactive unsaturated carbon to carbon bonds per molecule in the polyene and (b) the thiol groups per molecule in the polythiol being greater than four, which comprises adding to the composition 0.01 to 10.0 percent by weight of a curing rate accelerator from the group consisting of oxalic acid and an α-hydroxy carboxylic acid of the formula

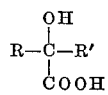

wherein R and R' are independently selected from the group consisting of CH₂COOH, —CHOHCOOH, hydrogen, aryl, alkyl containing 1–18 carbon atoms and exposing the composition to ambient conditions.

19. The process according to claim 18 wherein the curing rate accelerator is a member of the acid group consisting of citric, malic, tartaric, oxalic, lactic, atrolactic, mandelic and benzilic acid.

20. The process of curing to a hardened mass a liquid curable composition consisting essentially of (1) a polyene containing at least two unsaturated carbon to carbon bonds per molecule reactive with polythiols, and (2) a polythiol containing at least two thiol groups per molecule, which comprises adding to the composition 0.01 to 10.0 percent by weight of a curing rate accelerator from the group consisting of oxalic acid and an α-hydroxy carboxylic acid of the formula

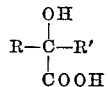

wherein R and R' are independently selected from the group consisting of —CH₂COOH, —CHOHCOOH, hydrogen, aryl, alkyl containing 1–18 carbon atoms and exposing the composition to U.V. radiation.

21. The process according to claim 20 wherein the curing rate accelerator is a member of the acid group consisting of citric, malic, tartaric, oxalic, lactic, atrolactic, mandelic and benzilic acid.

(References on following page)

References Cited

UNITED STATES PATENTS

| | | | |
|---|---|---|---|
| 2,767,156 | 10/1956 | Tawney | 260—41.5 |
| 3,041,304 | 6/1962 | Gardner | 260—41.5 |
| 3,226,356 | 12/1965 | Kehr | 260—41 |
| 3,240,844 | 3/1966 | Gruver | 260—894 |
| 3,305,517 | 2/1967 | Kehr | 260—41 |
| 3,338,810 | 8/1967 | Warner | 204—159.18 |

JOSEPH L. SCHOFER, Primary Examiner

C. A. HENDERSON, Jr., Assistant Examiner

U.S. Cl. X.R.

117—122, 123, 147, 152; 204—159.18, 159.24; 260—41.5, 75, 77.5, 78, 79.3, 79.5, 823, 824, 838, 857, 858, 865, 874, 881, 887, 888.

PO-1050
(5/69)

UNITED STATES PATENT OFFICE
CERTIFICATE OF CORRECTION

Patent No. 3,578,614　　　　　　　Dated　May 11, 1971

Inventor(s) Walter R. Wszolek

It is certified that error appears in the above-identified patent and that said Letters Patent are hereby corrected as shown below:

Column 9, Claim 1 should be corrected as follows:

Line 8:　Begin the Claim with the word -In-

Line 9:　Delete the word "reactive"

Line 10:　After the words "per molecule" add the words -reactive with polythiols-.

Line 15:　Delete "and (3)" and add the words -the improvement comprising the presence of-.

Signed and sealed this 28th day of December 1971.

(SEAL)
Attest:

EDWARD M. FLETCHER, JR.　　　　　　ROBERT GOTTSCHALK
Attesting Officer　　　　　　　　　　Acting Commissioner of Patents